US011940107B2

(12) United States Patent
Van Bommel et al.

(10) Patent No.: US 11,940,107 B2
(45) Date of Patent: Mar. 26, 2024

(54) LIGHTING DEVICE AND A METHOD OF MANUFACTURING A LIGHTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/031,921

(22) PCT Filed: Oct. 5, 2021

(86) PCT No.: PCT/EP2021/077380
§ 371 (c)(1),
(2) Date: Apr. 14, 2023

(87) PCT Pub. No.: WO2022/078813
PCT Pub. Date: Apr. 21, 2022

(65) Prior Publication Data

US 2023/0383916 A1 Nov. 30, 2023

(30) Foreign Application Priority Data

Oct. 15, 2020 (EP) .................................... 20201917

(51) Int. Cl.
*F21S 4/22* (2016.01)
*F21K 9/232* (2016.01)
(Continued)

(52) U.S. Cl.
CPC ................ *F21S 4/22* (2016.01); *F21K 9/232* (2016.08); *F21Y 2107/70* (2016.08); *F21Y 2115/10* (2016.08)

(58) Field of Classification Search
CPC ....... F21S 4/22; F21S 4/20; F21S 4/00; F21K 9/232; F21Y 2115/10; F21Y 2107/70;
(Continued)

(56) References Cited

U.S. PATENT DOCUMENTS 10,753,569 B2 * 8/2020 Tan ...................... F21S 43/236
10,767,816 B1 9/2020 Wu et al.
(Continued)

FOREIGN PATENT DOCUMENTS

EP 2778503 A2 9/2014
JP 2012164518 A 8/2012
(Continued)

*Primary Examiner* — Bao Q Truong

(57) ABSTRACT

A lighting device (1) is provided. The lighting device (1) comprises a housing (10) and a flexible elongated carrier (20) having a first side (20*a*) and a second side (20*b*). The elongated carrier (20) comprises a plurality of first sections (21), each first section (21) comprising a plurality of solid state lighting elements (25) arranged on the first side (20*a*) of the elongated carrier (20). Each first section (21) is arranged at a distance (d1) from a surface (15) of the housing. The elongated carrier (20) further comprises a plurality of second sections (22). Each second section (22) is at least in part attached to the surface of the housing (15). The first sections (21) and the second sections (22) are alternatingly arranged in a succession along a longitudinal extension of the elongated carrier (20). The elongated carrier (20) has been bent and/or folded at at least some of the second sections (22) such that the elongated carrier (20) has a shape in accordance with a shape of a spiral as seen from above the surface (15) of the housing (20).

14 Claims, 6 Drawing Sheets

(51) Int. Cl.
*F21Y 107/70* (2016.01)
*F21Y 115/10* (2016.01)

(58) Field of Classification Search
CPC .. F21Y 2107/00; F21V 23/004; F21V 23/005; F21V 23/006; F21V 15/012
See application file for complete search history.

(56) References Cited

U.S. PATENT DOCUMENTS

| | | | | |
|---|---|---|---|---|
| 2014/0268739 | A1* | 9/2014 | Veres | F21K 9/232 362/249.06 |
| 2015/0131284 | A1 | 5/2015 | Berends | |
| 2016/0341370 | A1* | 11/2016 | Dekker | F21K 9/237 |
| 2019/0049073 | A1* | 2/2019 | Eckert | F21K 9/232 |
| 2019/0212004 | A1 | 7/2019 | Van Bommel et al. | |

FOREIGN PATENT DOCUMENTS

| | | | |
|---|---|---|---|
| JP | 2019194950 | A | 11/2019 |
| WO | 2019038222 | A1 | 2/2019 |
| WO | 2019048345 | A1 | 3/2019 |
| WO | 2020089146 | A1 | 5/2020 |

* cited by examiner

LIGHTING DEVICE AND A METHOD OF MANUFACTURING A LIGHTING DEVICE

CROSS-REFERENCE TO PRIOR APPLICATIONS

This application is the U.S. National Phase application under 35 U.S.C. § 371 of International Application No. PCT/EP2021/077380, filed on Oct. 5, 2021, which claims the benefit of European Patent Application No. 20201917.0, filed on Oct. 15, 2020. These applications are hereby incorporated by reference herein.

TECHNICAL FIELD

The present invention relates to a lighting device which comprises a flexible elongated carrier, comprising a plurality of first sections, each of which comprises a plurality of solid state lighting elements arranged on a first side of the elongated carrier, and a plurality of second sections, each second section being at least in part attached to a surface of a housing of the lighting device. The present invention further relates to a method of manufacturing a lighting device.

BACKGROUND

Light-emitting diode (LED)-based lighting is increasingly replacing incandescent lamps in most fields of use. However, many users still enjoy the appearance of incandescent lamps, but still want to enjoy the benefits which come with switching to LED-based lamps and lighting. This has created the solution of creating LED lamps and bulbs that resemble the appearance of incandescent lamps, luminaires and bulbs, wherein the wire filament is replaced with LED light sources. Known concepts include LEDs sealed or covered by a component to produce the appearance of filaments, of various shapes, inside a transparent or translucent bulb. The LED filament(s) are further connected to a LED module, which may comprise electrical wiring and/or a power supply. Solutions according to, or similar, to the concept mentioned above are generally able to produce intended effect of resembling that of an incandescent lamp. However, the appearance of the filaments by solutions according to, or similar, to the concept mentioned may not sufficiently resemble that of incandescent lamps. Further, the production of solutions according to, or similar, to the concept mentioned may be expensive or complex to assemble. Hence, it may be of interest to provide a lighting device comprising a lighting device which may increase the resemblance to incandescent lamps and/or reduce the cost and/or the complexity of production of the lighting device.

SUMMARY

In view of the above discussion, a concern of the present invention is to provide a lighting device which can increase the resemblance to incandescent lamps and/or reduce the cost and/or the complexity of production of the lighting device. It is further a concern of the present invention to provide a lighting device which can resemble a diagonal spiral filament appearance of some incandescent lamps.

To address at least one of these concerns and other concerns, a lighting device and a method of manufacturing a lighting device in accordance with the independent claims are provided. Preferred embodiments are defined by the dependent claims.

According to a first aspect of the present invention, a lighting device is provided. The lighting device may comprise a housing and a flexible elongated carrier. The elongated carrier may have a first side and a second side. The elongated carrier may comprise a plurality of first sections. Each first section may comprise a plurality of solid state lighting elements arranged on the first side of the elongated carrier. Each first section may be arranged at a distance from a surface of the housing. The elongated carrier may comprise a plurality of second sections. Each second section may be at least in part attached to the surface of the housing. The first sections and the second sections may be alternatingly arranged in a succession along a longitudinal extension of the elongated carrier. The elongated carrier may have been bent and/or folded at at least some of the second sections such that the elongated carrier has a shape in accordance with a shape of a (e.g., three-dimensional, 3D) spiral as seen from above the surface of the housing.

According to a second aspect of the present invention, a method of manufacturing a lighting device is provided. The method may comprise providing a housing and providing a flexible elongated carrier. The elongated carrier may have a first side and a second side. The elongated carrier may comprise a plurality of first sections. Each first section may comprise plurality of solid state lighting elements arranged on the first side of the elongated carrier. The elongated carrier may comprise a plurality of second sections. The first sections and the second sections may be alternatingly arranged in a succession along a longitudinal axis of the elongated carrier. The method may comprise bending or folding the elongated carrier at at least some of the second sections and attaching each second section at least in part to a surface of the housing, such that each first section is arranged at a distance from the surface of the housing, and such that the elongated carrier has a shape in accordance with a shape of a spiral as seen from above the surface of the housing.

By the plurality of first sections, each comprising a plurality of solid state lighting elements, and each of which may be arranged at a distance from a surface of the housing of a lighting device, and by the elongated carrier having been bent and/or folded at at least some of the second sections such that the elongated carrier has a shape in accordance with a shape of a spiral as seen from above the surface may provide an increased spiral filament appearance of the lighting device. Rather than having to install a plurality of solid state lighting elements in different positions in the lighting device to achieve a spiral filament appearance of the lighting device, a lighting device comprising a flexible elongated carrier may be bent and/or folded to achieve that, which may reduce the cost and/or the complexity of the production. A flexible elongated carrier comprising first sections, each comprising a plurality of solid state lighting elements, and second sections, at least in part attached to the surface of the housing, such that the first sections are arranged at a distance from the surface of the housing may increase the spiral filament appearance of the lighting device. In alternative, the lighting device may be a light-emitting diode (LED) filament arrangement.

By the term "flexible elongated carrier" it is meant, for example, that the elongated carrier is configured or arranged such that it may be bent and/or folded, or that a shape of the elongated carrier is malleable or adaptable. By the terms "first side" and "second side" it is meant, for example, an upper side and a lower side, respectively. By the term "arranged at distance from a surface of the housing" it is meant, for example, arranged above a surface of the housing.

It is to be understood that the term "at least in part attached" may comprise, for example, one or more parts being attached. By the term "alternatingly arranged in a succession along a longitudinal extension of the elongated carrier" it is meant, for example, arranged such that each first section has second sections arranged before and after the respective first section, respectively, along a longitudinal extension of the elongated carrier. Further, it is to be understood that the succession may start and finish with a first section or a second section. Thereby, the elongated carrier may comprise one more first section than there are second sections, or the elongated carrier may comprise one more second section than there are first sections. The plurality of first sections being aligned with each other may be understood as a center of each first section being aligned with each other, wherein the center may be understood as a center, middle, or middle-point, along a longitudinal extension of the respective first section. By the term bent and/or folded it is meant, for example, that a second section is bent and/or folded such that at least parts of the second section is turned over. By the term "turned over" it is meant, for example, that the first side and the second side of the second section may be facing a direction which is opposite to the direction which it was facing before the bending or folding, or that at least parts of the first side and the second side of the second section are facing in the same direction. By the term "a shape in accordance with a shape of a spiral" it is meant, for example, that a shape may substantially be equal to a shape of a spiral, or that a shape may be a portion of a shape of a spiral. For example, a shape in accordance with a shape of a spiral may be understood as the shape on a side of a plane, wherein the plane is intersecting a shape of a spiral. Further, the plane which may intersect a shape of a spiral may be parallel to an axis of the shape of a spiral. Hence, shape of a spiral may have an axis which is arranged parallel to a plane or a surface, such that two portions of the shape of the spiral are on either of the plane or the surface, respectively, and the shape in accordance with a shape of a spiral may be understood as either of the two portions of the shape of the spiral. The elongated carrier may have been bent and/or folded at at least some of the second sections such that the plurality of first sections are aligned with each other as seen from above the surface of the housing.

Each or any of the solid state lighting elements may for example comprise one or more light-emitting diodes (LEDs), and/or some other type(s) of solid state lighting element. Further, each or any of the solid state lighting elements may for example comprise inorganic LED(s) and/or organic LED(s) (OLEDs). Each or any of the solid state lighting elements may for example comprise polymer/polymeric LEDs, violet LEDs, blue LEDs, optically pumped phosphor coated LEDs, optically pumped nano-crystal LEDs. As used herein, the term "LED" can encompass a bare LED die arranged in a housing, which may be referred to as a LED package. The plurality of solid state lighting elements, of each or any first section, may comprise, preferably, at least ten LEDs. Additionally, each or any of the second sections may not comprise any solid state lighting elements. For example, the second sections may not comprise any LEDs.

The lighting device may comprise one or more other components or parts. Such other components or parts may for example comprise a power supply and/or electrical wiring or conductors, a control unit, a housing, and/or fixation arrangements for the different components in the lighting device. The control unit may for example comprise driver circuitry for controlling supply of power to the solid state lighting elements and/or for controlling operation of the solid state lighting elements. The lighting device may comprise other circuitry, e.g., circuitry capable of converting electricity from a power supply to electricity suitable to operate or drive the solid state lighting elements. Such circuitry may be capable of at least converting between Alternating Current and Direct Current and converting voltage into a suitable voltage for operating or driving the solid state lighting elements.

The elongated carrier may be bent and/or folded such that each first section has a selected (e.g., a first) shape, as seen from above the surface of the housing. For example, each of the plurality of first sections may have a same shape, or substantially the same shape, or similar shape. The selected shape may be in accordance with a shape of a spiral.

The spiral may be configured as a helix. Thus, the elongated carrier may have been bent and/or folded at at least some of the second sections such that the elongated carrier has a shape in accordance with a shape of a helix as seen from above the surface of the housing. Further, the spiral may be understood as a corkscrew and/or as having a helical shape. The helix is a type of space curve with tangent lines at a constant angle to a fixed axis.

The elongated carrier may be bent and/or folded at at least some of the second sections such that the plurality of first sections are parallel with each other as seen from above the surface of the housing. The second sections may be bent and/or folded at at least some of the second sections and at least in part attached to the surface of the housing such that the plurality of first sections are parallel with each other as seen from above. Each first section may be understood to be extending in a plane, wherein the planes of the respective first sections may be parallel to each other.

At least some of the first sections may be arranged at an angle to an axis of the spiral, wherein the angle is between 5 and 60 degrees. According to an example, preferably at least three sections may be arranged at an angle to an axis of the spiral, wherein the angle is between 5 and 60 degrees. Further, the angle may be between 10 and 50 degrees, or between and 45 degrees.

At least some of the first sections may be arranged at a distance from another first section. The other first section may be arranged before or after the respective first section in the succession. The distance may be in a direction of a longitudinal extension of the respective first section as seen from above the surface of the housing. Each first section may be arranged at a distance from another subsequent first section. The distance between two subsequent first sections in the succession may be substantially equal for all of the plurality of first sections. The distance may be, preferably, at least 0.8 cm. Further, the distance may be, preferably, less than 3 cm.

At least some of the first sections may be arranged at a distance from another first sections. The other first section may be arranged before or after the respective first section in the succession. The distance may be in a direction which is parallel to an axis of the spiral. The axis may be understood as the spiral axis. Further, the spiral may be understood as a three-dimensional curve that turns around the axis at a constant or continuously varying distance while moving parallel to the axis. Further, at least three of the first sections may be arranged at a distance from another first sections.

Each first section may be arranged at a distance from another first section, wherein the other first section may be arranged before or after the respective first section in the succession. The distance may be in a direction which is parallel to a direction of alignment of the plurality of first sections. The distance between two subsequent first sections may be substantially equal for all of the plurality of first sections. The distance may be measured between the centers of two subsequent first sections.

At least some of the second sections may be bent and/or folded at least twice. However, it is to be understood that the embodiments of the present invention are not limited to at least some of the second sections being bent and/or folded twice. For example, at least some of the second sections may be bent and/or folded once, twice, thrice, or more times. Further, the embodiments of the present invention are not limited to at least some of the second sections being bent and/or folded, and it is to be understood that at least some of the second sections may be curled, tucked, or doubled-up.

At least some of the second sections may be bent and/or folded at an angle between 30 and 60 degrees. Further, at least some of the second sections may be bent and/or folded at an angle between 40 and 50 degrees. Furthermore, at least some of the second sections may be bent and/or folded at an angle of substantially 45 degrees. The bending or folding may be understood as a bending or folding along an axis or line, which may be understood as a folding axis or folding line. The angle may be defined by an angle between the folding axis and a longitudinal axis of the second section.

At least some of the second sections may be bent and/or folded such that the bends or the folds define at least some of the second sections into a first portion, a second portion, and a third portion arranged in a succession along a longitudinal extension of the respective second sections. A length of the third portion may be greater than a length of the first portion. A length of the second portion may be greater than a length of the third portion. The bending or folding may be understood as a first bending or folding and a second bending or folding. The first bending or folding may be at an angle substantially equal to an angle of the second bending or folding. However, the first bending or folding may be at an angle different from the angle of the second bending or folding.

Each first section may have a first border to a second section arranged before the respective first section in the succession and a second border to another second section arranged after the respective first section in the succession. At least some of the second sections may be folded such that a distance between the first border and the second border of each first section is less than a length of said first section, wherein the length is in longitudinal extension of said first section.

The plurality of first sections may be arranged such that one border of the first border and the second border are arranged substantially along a straight line, and such that the other border of the first border and the second border are arranged substantially along another straight line. For example, the plurality of first sections may be arranged such that the first borders are arranged along a straight line, and such that the second borders are arranged along another straight line. The shortest distance between the straight lines may be less than a length of at least some of the first sections, along a longitudinal extension of respective first section. Further, the straight lines may be parallel. Furthermore, the straight lines may be parallel to a direction of alignment of the plurality of first sections. At least some of the plurality of first sections may be arranged at an angle to a direction of alignment of the plurality of first sections. The angle may be between 30 to 90 degrees with regards to one, or both, of the straight lines. Further, the angle may be between 30 to 90 degrees with regards to the direction of alignment.

Each first section may be arranged in the shape of circular arc. In other words, each first section may be arranged in a curved shape. Further, each first section may be arranged along a perimeter of a circular sector. The term "arc" may be understood as, for example, a partial circle and/or a chord. The circular arc may have a constant radius. The first side of each first section may be facing away from the surface of the housing. Consequently, the second side of each first section may be facing the surface of the housing. A middle-point of each first section along a longitudinal extension of the respective first section may be arranged at a distance from the surface of the housing which is greater than a distance from the surface of the housing to any other point of the respective first section. The borders of each first section may be arranged at a distance from the surface of the housing which is less than any other point of the respective first section. The borders of each first section may be arranged at an equal distance from the surface of the housing, wherein the distance may be measured in a direction perpendicular to the surface of the housing.

Each circular arc may be lying in a plane which is perpendicular to the surface of the housing. Each first section may be arranged along an arc of a circular sector, wherein the circular sector is perpendicular to the surface of the housing. Hence, the planes which the plurality of circular arcs may be lying may be parallel to each other. However, it is to be understood that a circular arc may be lying in a plane which is at an angle to the surface, wherein the angle may be between 1 to 45 degrees.

A central angle of a circular sector defined by the circular arc may be at least 180 degrees. The central angle of a circular sector defined by the circular arc may be between 200 and 340 degrees.

The elongated carrier may comprise light-transmissive material. The solid state lighting elements, comprised in the at least one first sector, may be encapsulated by an encapsulant comprising a luminescent material and/or light scattering material. The encapsulant may comprise wavelength converting material configured to convert at least a part of light input therein into light having a selected wavelength range. The elongated flexible carrier may for example be constituted by or comprised in a LED strip.

For each or any first section, the plurality of solid state lighting elements may be encapsulated by an encapsulant, the encapsulant comprising a luminescent material and/or a light scattering material. The encapsulant may, preferably, cover at least 90% of each first section encapsulated by the encapsulant. Further, the encapsulant may provide a line emission, a line emission and/or a spectral line.

The lighting device, which may be understood as a LED filament arrangement, may provide LED filament light. The LEDs of the lighting device may provide LED light. The luminescent material may at least partly convert LED light into converted light. The converted light and/or LED light may be understood as LED filament light. Further, the LED filament light may be, preferably, white light. The white light may have a correlated color temperature in the range from 1800-6000 K. Further, the white light may have a color rendering index (CRI) of, preferably, at least 80.

Each or any first section may comprise a plurality of solid state lighting elements arranged on the second side of the elongated carrier. The plurality of solid state lighting elements arranged on the second side of the elongated carrier may be arranged in a mirrored fashion to the plurality of solid state lighting elements arranged on the first side of the elongated carrier. Hence, for each or any first section, for each solid state lighting element arranged on the first side of the elongated carrier there may be a solid state lighting element arranged on the opposite side, the second side, of the elongated carrier.

BRIEF DESCRIPTION OF THE DRAWINGS

Exemplifying embodiments of the invention will be described below with reference to the accompanying drawings.

Figure 1:
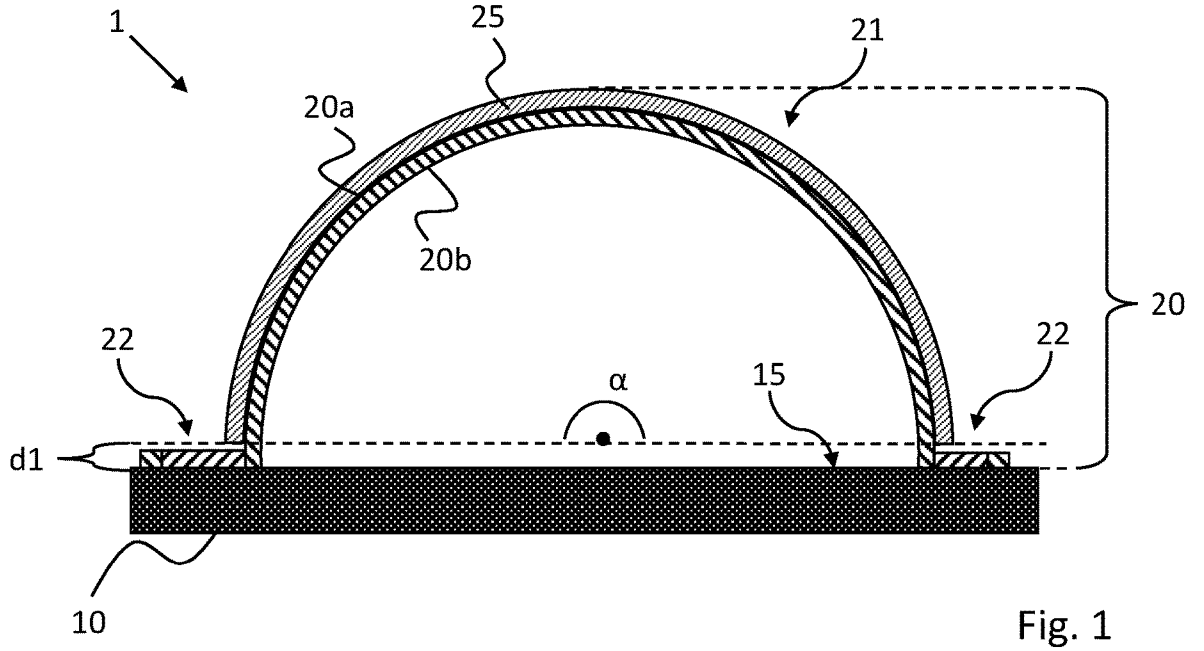
FIGS. 1-3 are schematic views of cross-sections of lighting devices according to one or more exemplifying embodiments of the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 is a schematic view of a cross-section of a lighting device 1 according to one or more exemplifying embodiments of the present invention. The shown lighting device 1 comprises a housing 10. The cross-section of FIG. 1 is perpendicular to a surface 15 of the housing 10. The shown lighting device 1 further comprises a flexible elongated carrier 20 which has a first side 20*a* and a second side 20*b*. The elongated carrier 20 is shown to comprise diagonal lines within boundaries of the elongated carrier. It is to be understood that the diagonal lines are drawn to differentiate the elongated carrier 20 from the other features of FIG. 1, and to thereby increase understanding. The elongated carrier 20 comprises a plurality of first sections 21 and a plurality of second section 22. In FIG. 1, there is shown one first section 21 and two second sections 22. However, it is to be understood that in embodiments of the present invention, the elongated carrier 20 may comprise any number of first sections 21 and second sections 22, and is not limited to the exemplary embodiment as shown in FIG. 1. The first section 21 and the second sections 22 are alternatingly arranged in a succession along a longitudinal extension (not shown in FIG. 1; see, e.g., FIG. 7) of the elongated carrier 20. The first section 21 is shown to comprise a plurality of solid state lighting elements, schematically indicated by reference numeral 25, wherein the plurality of solid state lighting elements 25 is arranged along the first section 21 and on a first side 20*a* of the elongated carrier 20. A first section 21 may be understood as a section of the elongated carrier 20 which comprises a plurality of solid state lighting elements. The plurality of solid state lighting elements 25 of FIG. 1 may be understood as, for example, a plurality of light-emitting diodes (LEDs), or a LED filament. The shown plurality of solid state lighting elements 25 may be encapsulated by an encapsulant, wherein the encapsulant may comprise a luminescent material and/or a light scattering material. The shown elongated carrier 20 comprises two borders arranged between the first section 21 and the second sections 22, respectively. The borders are arranged at a distance d1 from the surface 15, wherein the distance d1 is in a direction perpendicular to the surface 15. The shown first section 21 is arranged in the shape of a circular arc. The circular arc may be understood as beginning at one border and ending at the other border. A central angle $\alpha$ of a circular sector defined by the shown circular arc has an angle of substantially 180 degrees (i.e. substantially $\pi$ rad). The circular arc is lying in the plane of the cross-section which is perpendicular to the surface 15. A length of the first section 21, along the circular arc, is greater than a distance between the two borders. The length of the first section 21 may be defined as the arc length of the circular arc, which may be understood as the central angle $\alpha$ times the radius of the circular sector which is defined by the circular arc. Hence, the first section 21, as shown in in FIG. 1, is arranged along a circular arc which has the central angle $\alpha$ and which starts and ends at the two borders, respectively. The two shown second sections 22 are at least in part attached to the surface 15. It is to be understood that the cross-section shown in FIG. 1 may only show a portion of the second sections 22. FIG. 1 shows the elongated carrier 20 being bent or folded twice at each second section 22. For an increased understanding, the bends or folds are indicated by a switch of direction of the diagonal lines of the elongated carrier 20. Each shown second section 22 comprises a bend or fold which is closest to the first section 21, which has a substantially right angle such that a portion of the second section 22 which is closest to the first section is directed in a direction away from, or upward from, the surface 15. Hence, the shown second sections 22 have been folded such that the first section 21 is arranged at a distance d1 from the surface 15. Further, each second section 22 comprises a bend or fold which is further away from the first section 21 in a direction along the surface 15 and away from the first section 21, which is bent or folded such that a portion of the second section 22 (not shown; see e.g. FIGS. 4 and 5) is directed in a direction substantially parallel to the surface 15. It is to be understood that the second sections 22 may be attached to the surface along portions of the second sections 22 which are arranged along the surface 15.

Figure 2:
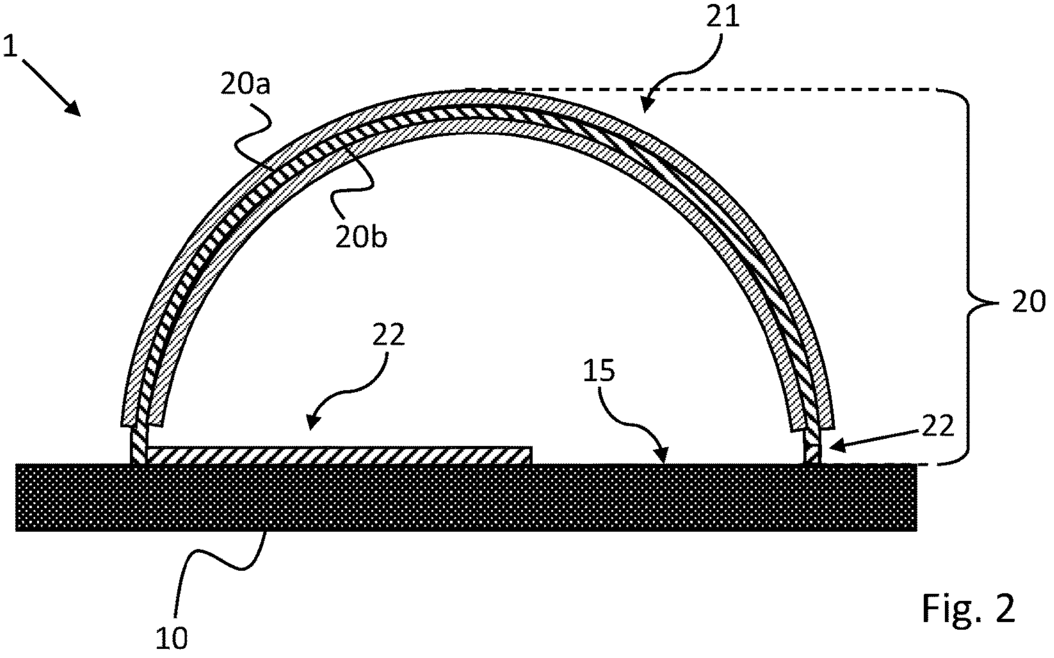

FIG. 2 is a schematic view of a cross-section of a lighting device 1 according to one or more exemplifying embodiments of the present invention. It should be noted that FIG. 2 comprises features, elements and/or functions as shown in FIG. 1 and described in the associated description herein. Hence, it is also referred to that figure and the description relating thereto for an increased understanding. The same reference numerals in FIGS. 1 and 2 denote the same or similar components, having the same or similar function. A difference between the lighting device 1 shown in FIG. 2 and the lighting device 1 shown in FIG. 1 is that the first section 21 of the lighting device 1 shown in FIG. 2 comprises a plurality of solid state lighting elements arranged on the second side 20*b* of the elongated carrier 20. The plurality of solid state lighting elements arranged on the first side 20*a* may be understood as a first plurality of solid state lighting elements, and the plurality of solid state lighting elements arranged on the second side 20*b* may be understood as a second plurality of solid state lighting elements. The first plurality of solid state lighting elements and the second plurality of solid state lighting elements are arranged along the first section 21 on opposite sides, the first side 20*a* and the second side 20*b*, respectively, of the elongated carrier 20. The first plurality of solid state lighting elements and/or the second plurality of solid state lighting elements shown in FIG. 2 may be understood as, for example, LEDs or one or more LED filaments. The plurality of solid state lighting elements may be understood as being arranged along the first side 20*a* and the second side 20*b* of the first section 21. A plurality of solid state lighting elements, or a plurality of light-emitting elements, may be arranged in an array along the first side 20*a* and/or the second side 20*b* of the first section 21. There may be an equal number of solid state lighting elements arranged on the first side 20*a* and the second side 20*b*. However, there may be a different number of solid state lighting elements arranged on the first side 20*a* and the second side 20*b*. Another difference between the lighting device 1 shown in FIG. 2 and the lighting device shown in FIG. 1 is how the two second sections 22 are arranged. In FIG. 2 both second sections 22 are shown to be bent or folded once. However, the second section 22, shown in FIG. 2 to be arranged on the right-hand side, is bent or folded at a substantially right angle such that a portion of the second section 22 (not shown; see e.g. FIGS. 4 and 5) is directed in a direction substantially perpendicular to the cross-section and substantially parallel to the surface 15. Hence, it is to be understood that the second section 22, shown in FIG. 2 to be arranged on the right-hand side, may comprise additional bends or folds. The second section 22, shown in FIG. 2 to be arranged on the left-hand side, is bent or folded at a substantially right angle such that a portion of the second section 22 is directed in a direction towards the other second section 22. Hence, a portion of the second section 22 is arranged along the surface 15 and between the first section 21 and the surface 15. The second section 22, shown in FIG. 2 to be arranged on the left-hand side, may be understood as arranged first or last in the succession along a longitudinal extension of the elongated carrier 20.

Figure 3:
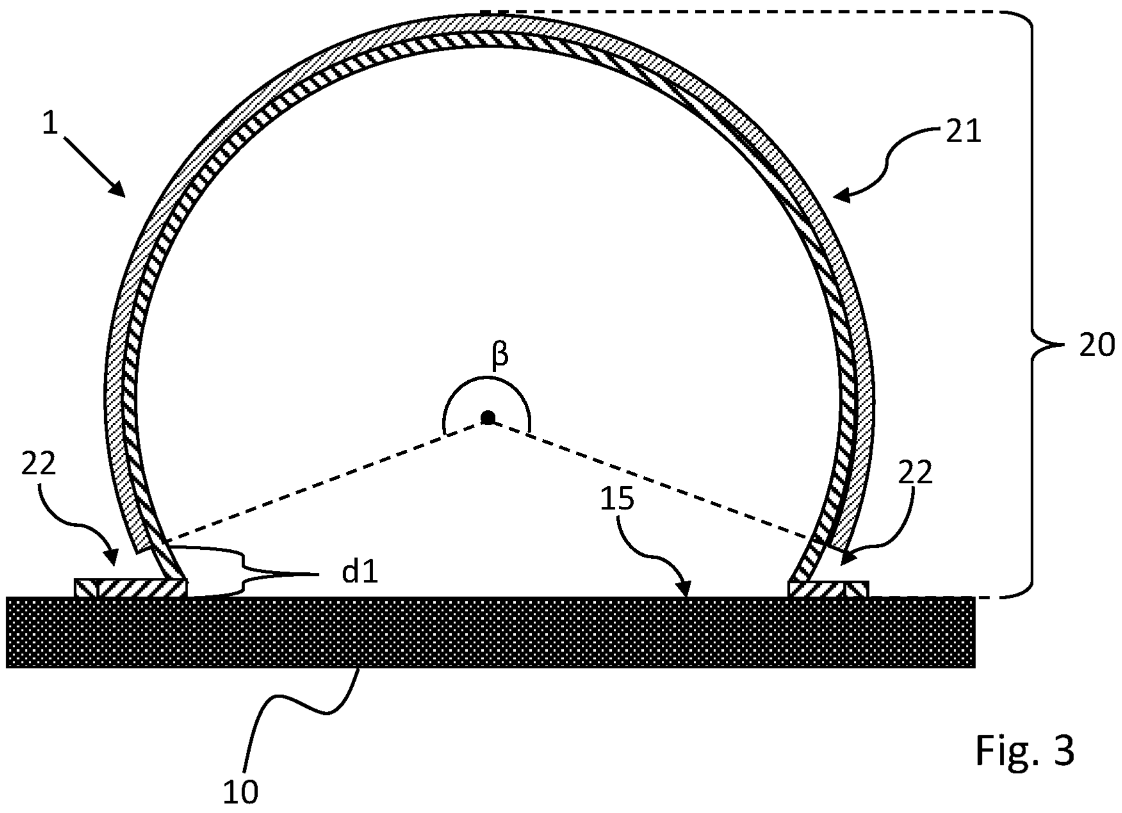

FIG. 3 is a schematic view of a cross-section of a lighting device 1 according to one or more exemplifying embodiments of the present invention. It should be noted that FIG. 3 comprises features, elements and/or functions as shown in FIGS. 1-2 and described in the associated descriptions herein. Hence, it is also referred to those figures and the descriptions relating thereto for an increased understanding. The same reference numerals in FIGS. 1, 2 and 3 denote the same or similar components, having the same or similar function. A difference between the lighting device 1 shown in FIG. 3 and the lighting device 1 shown in FIG. 1 is that the first section 21 is arranged in the shape of a circular arc, wherein a central angle β of a circular sector defined by the circular arc is greater than the central angle as shown in FIG. 1. The central angle β has an angle of approximately 225 degrees (i.e. (5/4)π rad). Therefore, each of the bends and/or folds of the second sections 22 which are closest to the first sections 21 have an angle greater than 90 degrees, such that a portion of each second section 22 closest to the first section 21 is directed in a direction away from the surface 15. Thereby, portions of the first section 21 is arranged above portions of the second sections 22 which are arranged along the surface 15. In other words, portions of the second sections 22 which are arranged along the surface 15 are arranged between the surface 15 and portions of the first section 21.

Figure 4:
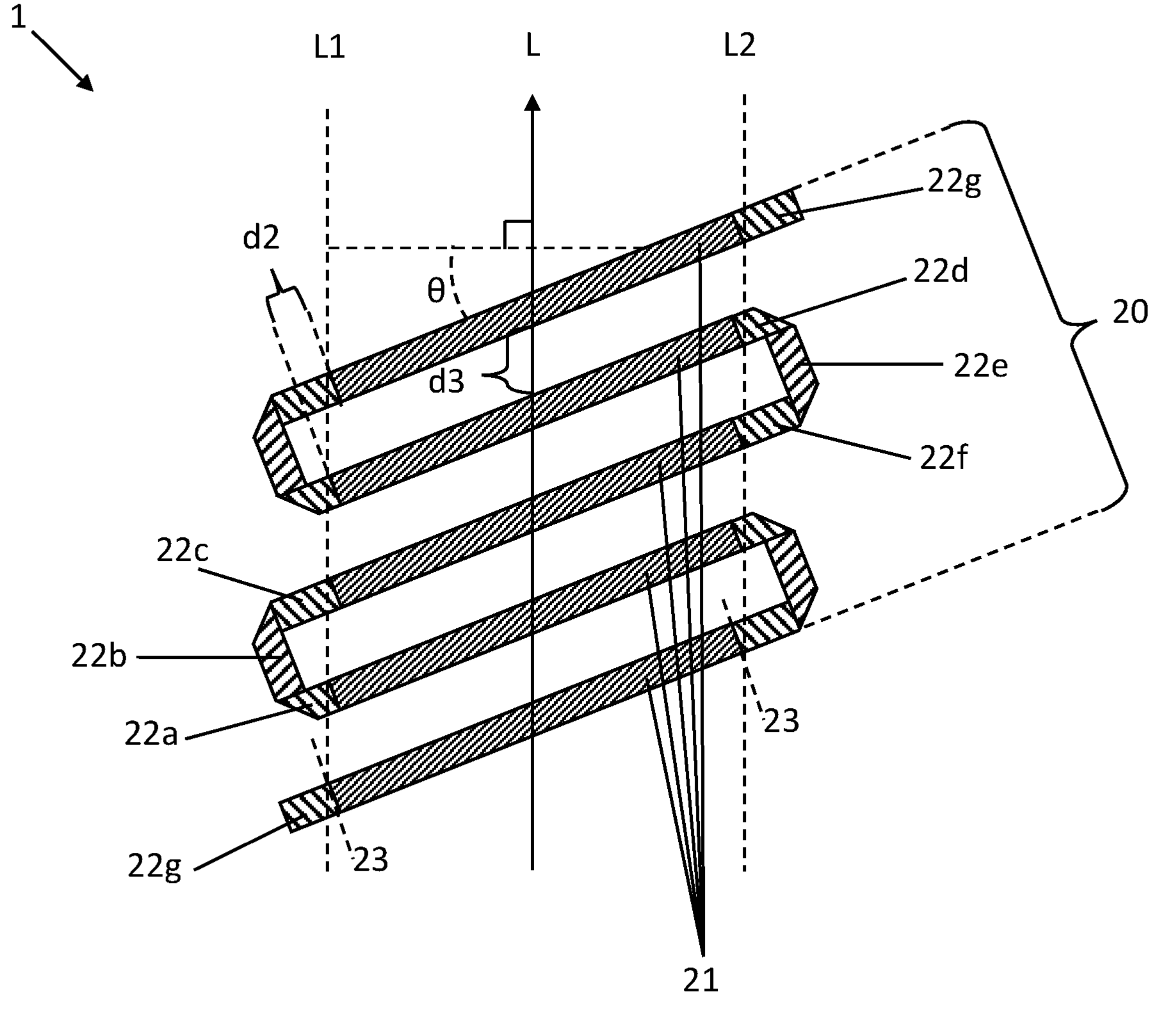
FIGS. 4-6 are schematic views of lighting devices according to exemplifying embodiments of the present invention.

FIG. 4 is a schematic view of a lighting device 1 according to one or more exemplifying embodiments of the present invention. It should be noted that FIG. 4 comprises features, elements and/or functions as shown in FIGS. 1-3 and described in the associated descriptions herein. Hence, it is also referred to those figures and the descriptions relating thereto for an increased understanding. The same reference numerals in FIGS. 1-3 and 4 denote the same or similar components, having the same or similar function. FIG. 4 shows a lighting device 1 as seen from above, wherein the viewing angle may be understood as perpendicular to a surface of a housing (not shown; see e.g. FIGS. 1-3) of the lighting device 1. The lighting device 1 shown in FIG. 4 comprises a flexible elongated carrier 20 having a first side and a second side. The elongated carrier comprises five first sections 21 and six second sections 22. The first sections 21 and the second sections 22 are alternatingly arranged in a succession along a longitudinal extension of the elongated carrier. The succession starts and ends with a second section 22. The elongated carrier has been bent or folded at four of the second sections 22. In other words, four of the second sections 22 have been bent or folded. Each of the four second sections 22 which have been bent or folded have been bent or folded twice. Each bend or fold is at an angle of substantially 45 degrees. Hence, a portion of a second section 22 on one side of the bend or fold is at an angle of twice the angle of the bend or fold, substantially 90 degrees in this example, to another portion of the second section 22 on the other side of the bend or fold. The four second sections 22 which have been bent or folded, have been bent or folded such that the bends or the folds defines each of the four second sections into a first portion 22*a*, 22*d*, a second portion 22*b*, 22*e* and a third portion 22*c*, 22*f*. The first portion 22*a*, 22*d*, the second portion 22*b*, 22*e* and the third portion 22*c*, 22*f* are arranged in a succession along a longitudinal extension of the respective second section 22. The first side and the second side of two succeeding portions of a second section 22, the two succeeding portions being defined by a bend or a fold, may be facing opposite directions. In FIG. 4, the first portions 22*a*, 22*d* and the third portions 22*c*, 22*f* of the respective second sections 22 are arranged such that the first side of the elongated carrier 20 is facing away, or upward, from the surface. Further, in FIG. 4, the second portions 22*b*, 22*e* of the respective second sections 22 are arranged such that the second side is facing away, or upward, from the surface. In other words, a bend or may fold change the direction of the second section 22, and the orientation, with regards to the first side and the second side, of the second section 22. In FIG. 4, a length of the third portion 22*c*, 22*f* is greater than a length of the first portion 22*a*, 22*d*, for each of the second sections 22 which have been bent or folded. Further, in FIG. 4, a length of the second portion 22*b*, 22*e* is greater than a length of the third portion 22*b*, 22*e*, for each of the second sections 22 which have been bent or folded. Two of the second sections 22 in FIG. 4 have not been folded, and thereby only comprise one portion 22*g*, which may be understood as an end portion. The second sections 22 may be at least in part attached to the surface. For example, parts of a portion of a second section 22*a*, 22*b*, 22*c*, 22*e*, 22*f*, 22*g* may be attached to the surface. In FIG. 4 parts of the first portion 22*a*, 22*d* and the second portion 22*b*, 22*e*, as well as parts of the second portion 22*b*, 22*f* and the third portion 22*c*, 22*f*, are overlapping each other. Hence, it may be understood that only parts of one of the portions may be attached to the surface at points where the portions overlap. However, the overlapping portions may also be attached to each other. Hence, an entire portion of a second section 22 may be attached the surface. The second section 22 may be attached to the surface by attachment means. By the term "attachment means" it is meant, for example, glue, adhesive and/or fastening paste. It may be understood that the second sections 22 may comprise attachments means for attaching and/or fixating the elongated carrier 20 to the surface. The first sections 21 may not comprise attachment means. Further, the first sections 21 may not be attached to the surface by attachment means. The second sections 22, in FIG. 4, have been bent or folded such that that the first sections 22 are aligned with each other. Further, second sections 22, in FIG. 4, have been bent or folded such that that the first sections 22 are parallel with each other. Furthermore, the flexible elongated carrier has been bent and/or folded at the second sections 22 such that the flexible elongated carrier 20 has a shape in accordance with a shape of a spiral. The spiral may be understood as a helix. A middle of each first section 21 is aligned with regards to the straight line L. In other words, the middle of each first section 21 is arranged along the straight line L. The first sections 21 are arranged at an angle θ with regards to the straight line L. The straight line L may be understood as a direction of alignment. Further, the straight line L may be understood as an axis of the spiral. The first sections 21 may be understood as being arranged aligned and diagonally with regards to the straight line L. Each first section 21 is arranged at a second distance d2 from another first section 21, wherein the other first section 21 is arranged before or after the respective first section 21 in the succession. The second distance d2 is in a direction of longitudinal extension of the respective first section 21. In FIG. 4 the second distances d2 are equal. However, it is to be understood that the second distances d2 may be different. Further, each first section 21 is arranged at a third distance d3 from another first section 21, wherein the other first section 21 is arranged before or after the respective first section 21 in the succession. The third distance d3 is in a direction which is parallel to the straight line L. In FIG. 4 the third distances d3 are equal. However, it is to be understood that the third distances d3 may be different. Each first section 21 has a first border to a second section 22 arranged before the respective first section 21 in the succession and a second border to another second section 22 arranged after the respective first section 21 in the succession. In FIG. 4, the second sections 22 have been bent or folded such that the first border of every other first section 21 along the succession and the second border of the remaining first sections 21 are aligned with regards to the straight line L1, wherein L1 is parallel to the straight line L. Further, the second border of every other first section 21 along the succession and the first border of the remaining first sections 21 are aligned with regards to the straight line L2, wherein L2 is parallel to the straight lines L and L1. It is to be noted that the number of first sections 21, second sections 22 and bends or folds shown in FIG. 4 is exemplary. There may be any number of first sections 21 and second sections 22 alternatingly arranged in the succession along the longitudinal extension of the elongated carrier 20. Further, at least some of the second sections may, for example, not be bent or folded, or bent or folded once, twice, thrice, four times, five times, or more.

Figure 5:
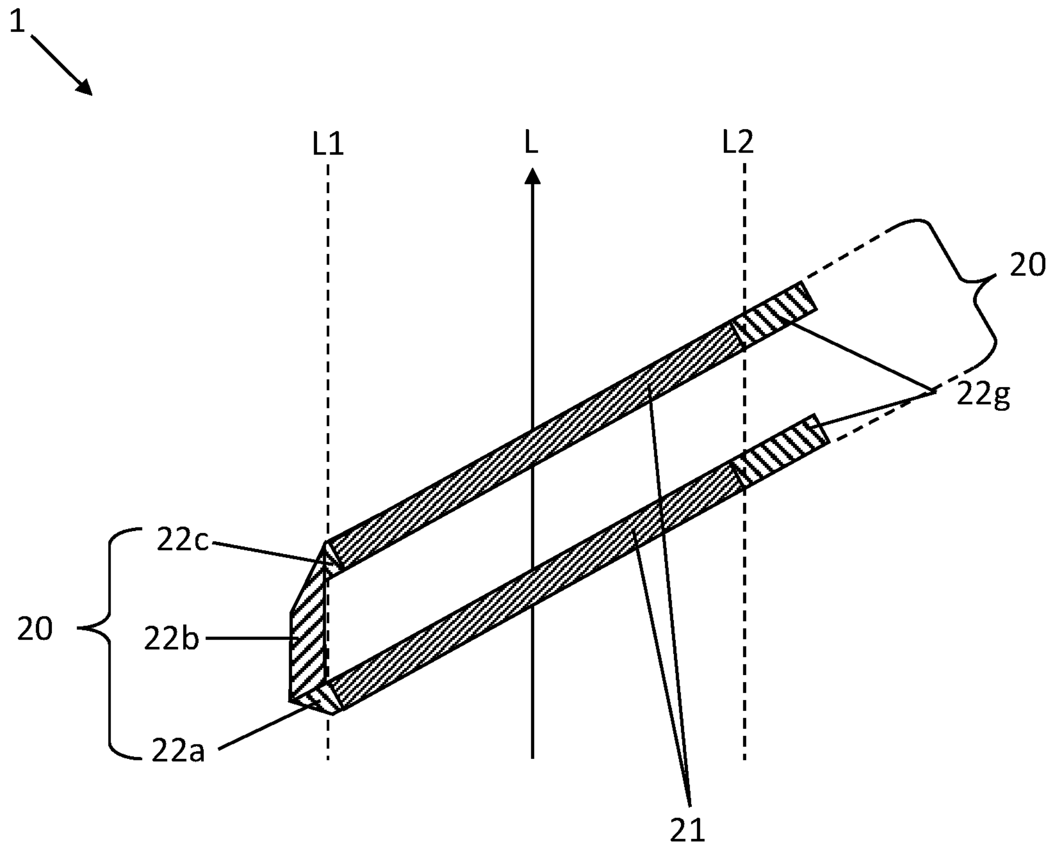

FIG. 5 is a schematic view of a lighting device 1 according to one or more exemplifying embodiments of the present invention. It should be noted that FIG. 5 comprises features, elements and/or functions as shown in FIGS. 1-4 and described in the associated descriptions herein. Hence, it is also referred to those figures and the descriptions relating thereto for an increased understanding. The same reference numerals in FIGS. 1-4 and 5 denote the same or similar components, having the same or similar function. A difference between the lighting device 1 as shown in FIG. 5 and the lighting device 1 as shown in FIG. 4 is that the lighting device 1 as shown in FIG. 5 comprises a flexible elongated carrier 20 comprising two first sections 21 and three second sections. Two of the second sections 22*g* are not shown to be bent or folded. The second section 22 arranged in the middle of the succession along a longitudinal extension of the elongated carrier is bent or folded such that the bends or the folds defines the second section 22 into a first portion 22*a*, a second portion 22*b*, and a third portion 22*c* arranged in a succession along a longitudinal extension of the second section 22. In FIG. 5, the two bends or the folds of the second section 22 have different angles. However, the second section 22 is bent or folded such that the first sections 21 are aligned and parallel with each other, with regards to the straight line L.

Figure 6:
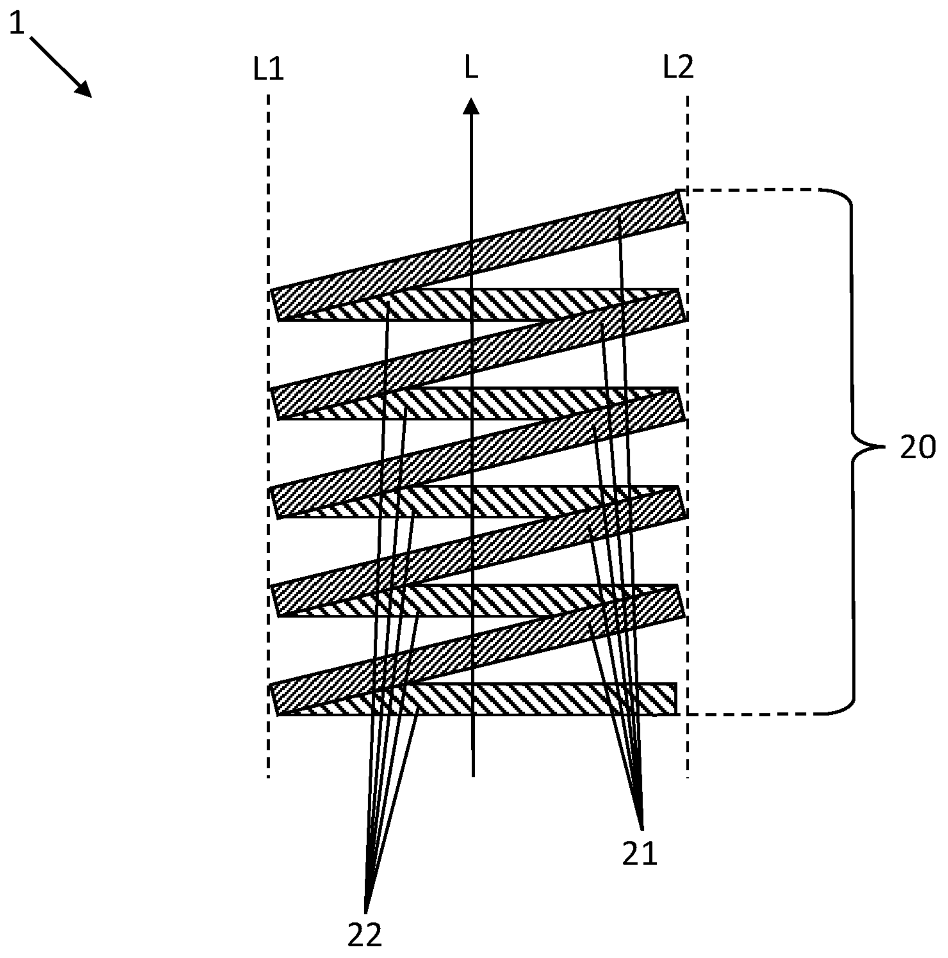

FIG. 6 is a schematic view of a lighting device 1 according to one or more exemplifying embodiments of the present invention. It should be noted that FIG. 6 comprises features, elements and/or functions as shown in FIGS. 1-5 and described in the associated descriptions herein. Hence, it is also referred to those figures and the descriptions relating thereto for an increased understanding. The same reference numerals in FIGS. 1-5 and 6 denote the same or similar components, having the same or similar function. A difference between the lighting device 1 as shown in FIG. 6 and the lighting device as shown in FIG. 4 is that the flexible elongated carrier 20 of the lighting device 1 as shown in FIG. 6 comprises five first sections 21 and five second sections 22. Hence, in FIG. 6, the succession along a longitudinal extension of the elongated carrier 20 begins with a second section 22 and ends with a first section 21. However, it is to be understood that according to embodiments of the present invention, the succession along a longitudinal extension of the elongated carrier 20 may start and/or end with a first section 21, or start and/or end with a second section 22. In FIG. 6, the second sections 22 are bent or folded such that the second sections are arranged between the second border of a first section 21 and the first border of another first section 21, wherein the other first section 21 is arranged after the first section 21 in the succession. Hence, in FIG. 6, each second section 22 is crossing the straight line L. In FIG. 6 the second sections 22 are arranged at a right angle to the straight line L. However, this is purely exemplary, and the second sections 22 may be arranged at substantially any angle with regards to the straight line L, such as, for example, between 5-15 degrees, or between 15-45 degrees. Further, in FIG. 6, the second sections 22 are bent or folded twice such that the first borders of each first section 21 are arranged along a straight line L1. Furthermore, in FIG. 6, the second sections 22 are bent or folded such that second borders of each first section 21 are arranged along another straight line L2. The angles of the two folds of each second section 22, in FIG. 6, are of equal value but in opposite directions. At least some of the second sections 22 in FIG. 6 have been bent and/or folded at least twice, wherein the four of the seconds sections 22 in FIG. 6 have been folded twice. Hence, not all second sections 22 in FIG. 6 have been folded at least twice. The first sections 21, as shown in FIG. 6, are arranged in substantially the same manner as shown in FIG. 4.

Figure 7:
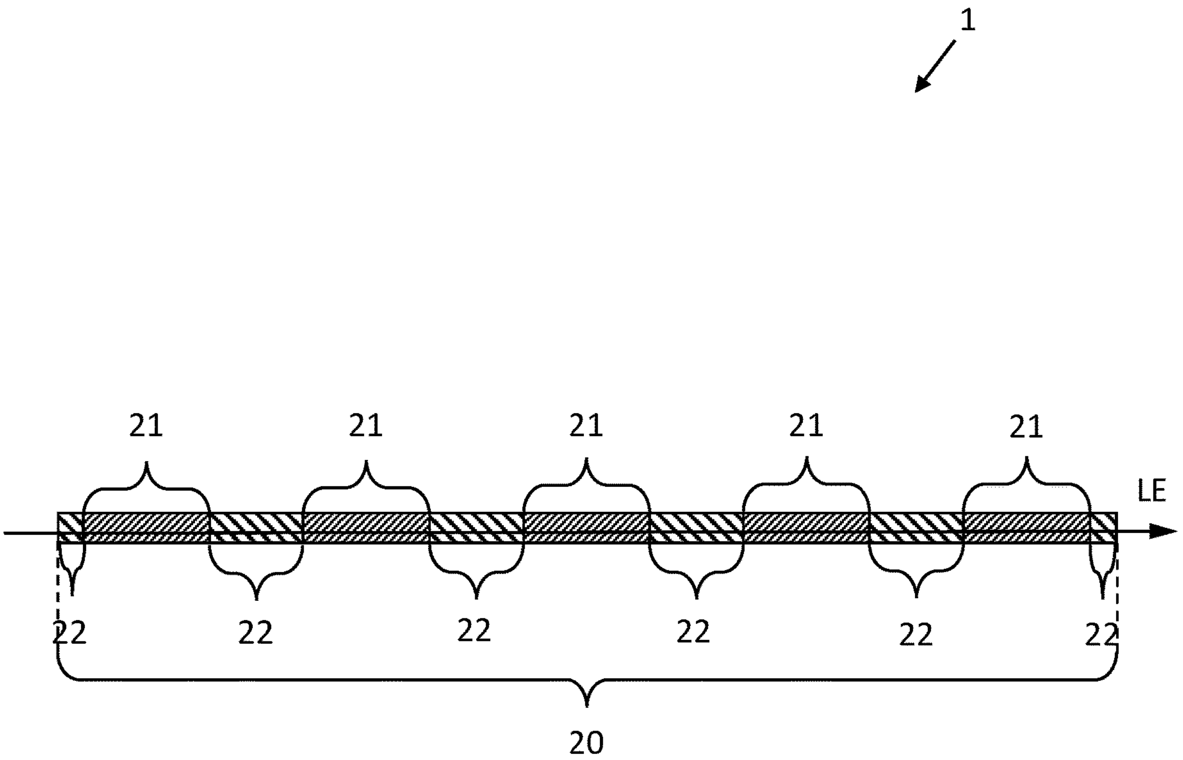
FIG. 7 is a schematic view of an elongated carrier of a lighting device according to one or more exemplifying embodiments of the present invention.

FIG. 7 is a schematic view of a flexible elongated carrier 20 of a lighting device. The flexible elongated carrier 20, in FIG. 7, comprises five first sections 21 and six second sections 22 which are alternatingly arranged in a succession along a longitudinal extension LE of the elongated carrier 20. FIG. 7 shows a flexible elongated carrier 20 in an un-bended or un-folded state. The flexible elongated carrier 20 may be bent and/or folded at at least some of the second sections 22 such that the flexible elongated carrier 20 has a shape in accordance with a shape of a spiral. Further, the flexible elongated carrier 20 may be bent and/or folded at at least some of the second sections 22 such that the first sections 21 are aligned with each other as seen from above a surface of a housing of a lighting device. Further, each second section 22 may be attached at least in part to the surface of the housing.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising
a housing; and
a flexible elongated carrier having a first side and a second side,
a plurality of first sections each first section comprising a plurality of solid state lighting elements, arranged on the first side of the elongated carrier, wherein each first section is arranged at a distance from a surface of the housing; and
a plurality of second sections, each second section being at least in part attached to the surface of the housing; and wherein
the first sections and the second sections are alternatingly arranged in a succession along a longitudinal extension of the elongated carrier; and wherein
the elongated carrier has been bent and/or folded at at least some of the second sections such that the elongated carrier has a shape in accordance with a shape of a spiral as seen from above the surface of the housing, and
wherein at least some of the second sections have been bent and/or folded at least twice.

2. A lighting device according to claim 1, wherein the elongated carrier is bent and/or folded such that each first section has a same shape, as seen from above the surface of the housing.

3. A lighting device according to claim 1, wherein at least some of the first sections are arranged at an angle to an axis of the spiral, wherein the angle is between 5 and 60 degrees.

4. A lighting device according to claim 1, wherein at least some of the first sections are arranged at a distance from another first section, wherein the other first section is arranged before or after the respective first section in the succession, and wherein the distance is in a direction which is parallel to an axis of the spiral.

5. A lighting device according to claim 1, wherein at least some of the second sections have been bent and/or folded at an angle between 30 and 60 degrees.

6. A lighting device according to claim 1, wherein at least some of the second sections have been bent and/or folded such that the bends or the folds define at least some of the second sections into a first portion, a second portion, and a third portion arranged in a succession along a longitudinal extension of the respective second sections, wherein a length of the third portion is greater than a length of the first portion.

7. A lighting device according to claim 1, wherein each first section has a first border to a second section arranged before the respective first section in the succession and a second border to another second section arranged after the respective first section in the succession, and wherein at least some of the second sections have been folded such that a distance between the first border and the second border of each first section is less than a length of said first section.

8. A lighting device according to claim 1, wherein each first section is arranged in the shape of a circular arc.

9. A lighting device according to claim 8, wherein each circular arc is lying in a plane which is perpendicular to the surface of the housing.

10. A lighting device according to claim 8, wherein a central angle of a circular sector defined by the circular arc is at least 180 degrees.

11. A lighting device according to claim 10, wherein the central angle of a circular sector defined by the circular arc is between 200 and 340 degrees.

12. A lighting device according to claim 1, wherein the elongated carrier comprises light-transmissive material.

13. A lighting device according to claim 1, wherein the plurality of solid state lighting elements are encapsulated by an encapsulant, the encapsulant comprising a luminescent material and/or a light scattering material.

14. A method of manufacturing a lighting device comprising:
providing a housing; and
providing a flexible elongated carrier having a first side and second side, and comprising
a plurality of first sections, each first section comprising at least one solid state lighting element, arranged on the first side of the elongated carrier, and
a plurality of second sections, and wherein the first sections and the second sections are alternatingly arranged in a succession along a longitudinal extension of the elongated carrier;
the method further comprising:
bending and/or folding the elongated carrier at at least some of the second sections that have been bent and/or folded at least twice,
and attaching each second section at least in part to a surface of the housing, such that each first section is arranged at a distance from the surface of the housing, and such that the elongated carrier has a shape in accordance with a shape of a spiral as seen from above the surface of the housing.

* * * * *